United States Patent
Kim et al.

(10) Patent No.: US 8,903,979 B2
(45) Date of Patent: Dec. 2, 2014

(54) ELECTRONIC DEVICE AND OPERATING METHOD OF THE SAME

(75) Inventors: Taekyoon Kim, Seoul (KR); Byunghyuk Jung, Seoul (KR); Hyeoncheol Cho, Seoul (KR); Byungjin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 189 days.

(21) Appl. No.: 13/521,415

(22) PCT Filed: Jan. 11, 2011

(86) PCT No.: PCT/KR2011/000180
§ 371 (c)(1),
(2), (4) Date: Jul. 10, 2012

(87) PCT Pub. No.: WO2011/090288
PCT Pub. Date: Jul. 28, 2011

(65) Prior Publication Data
US 2012/0317262 A1   Dec. 13, 2012

Related U.S. Application Data

(60) Provisional application No. 61/296,033, filed on Jan. 19, 2010, provisional application No. 61/296,031, filed on Jan. 19, 2010, provisional application No. 61/390,615, filed on Oct. 7, 2010.

(51) Int. Cl.
| | | |
|---|---|---|
| G06F 15/173 | (2006.01) | |
| H04N 21/436 | (2011.01) | |
| H04L 12/12 | (2006.01) | |
| H04L 12/28 | (2006.01) | |
| H04N 21/442 | (2011.01) | |
| H04N 21/462 | (2011.01) | |
| H04N 21/482 | (2011.01) | |
| H04L 29/08 | (2006.01) | |

(52) U.S. Cl.
CPC .......... *H04N 21/43615* (2013.01); *H04L 12/12* (2013.01); *H04L 12/2812* (2013.01); *H04N 21/44227* (2013.01); *H04N 21/4622* (2013.01); *H04N 21/482* (2013.01); *H04L 67/16* (2013.01); *H04L 2012/2849* (2013.01); *Y02B 60/34* (2013.01)
USPC ........................................................ 709/223

(58) Field of Classification Search
CPC . H04L 67/104; H04L 63/104; H04L 67/1059; H04L 67/1068; H04L 69/24
USPC .......... 709/223–226, 203–207, 217–219, 245
See application file for complete search history.

(56) References Cited

U.S. PATENT DOCUMENTS

| | | | |
|---|---|---|---|
| 2005/0027740 A1* | 2/2005 | Moritani et al. | ........... 707/104.1 |
| 2006/0026162 A1 | 2/2006 | Salmonsen et al. | |

(Continued)

FOREIGN PATENT DOCUMENTS

| | | | |
|---|---|---|---|
| CN | 1505885 A | 6/2004 | |
| WO | WO 2006/062375 A1 | 6/2006 | |

*Primary Examiner* — Ruolei Zong
(74) *Attorney, Agent, or Firm* — Mckenna Long & Aldridge LLP

(57) ABSTRACT

The present invention relates to an electronic device and an operating method of the same. The electronic device and the operation method of the same manage an object included in a network and provides a user interface for accessing a network, so the electronic device and the operation method of the same configure and manage the network more effectively.

14 Claims, 9 Drawing Sheets

(56) References Cited

U.S. PATENT DOCUMENTS

| | | |
|---|---|---|
| 2007/0078959 A1 | 4/2007 | Ye |
| 2007/0088675 A1 | 4/2007 | Duncan |
| 2007/0110056 A1 | 5/2007 | Hwang et al. |
| 2007/0130308 A1 | 6/2007 | Kim et al. |
| 2007/0156726 A1 | 7/2007 | Levy |
| 2007/0220558 A1 | 9/2007 | Jung et al. |
| 2008/0162669 A1 | 7/2008 | Tonoike et al. |
| 2009/0029691 A1* | 1/2009 | Shen et al. .................... 455/418 |
| 2009/0239469 A1 | 9/2009 | Rangarajan et al. |
| 2009/0240794 A1 | 9/2009 | Liu et al. |
| 2009/0245142 A1 | 10/2009 | Want et al. |
| 2010/0095332 A1* | 4/2010 | Gran et al. ..................... 725/93 |

* cited by examiner

Fig. 4
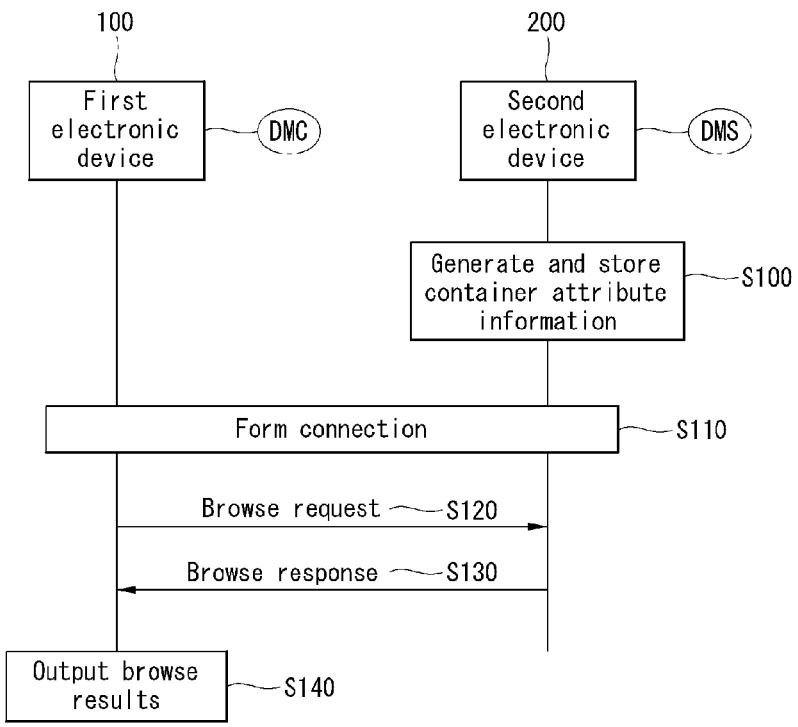
Fig. 5
| Attribute information | Description |
|---|---|
| @Size | Indicate the size of a container |
| @Item Count | Indicate the number of items within the container |
| @Container Count | Indicate the number of containers within the container |
Fig. 6
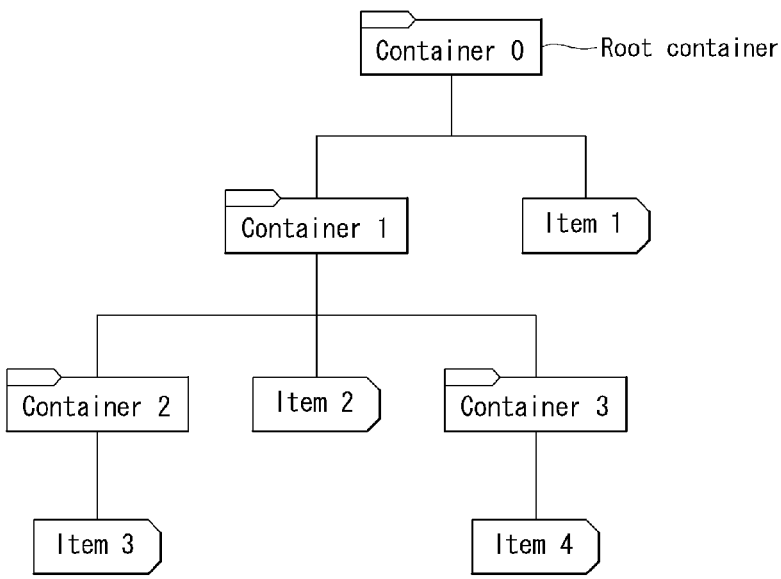

Fig. 7

| Container attribute information | @Size | @Item Count | @Container Count |
|---|---|---|---|
| Container 0 | 10,000 | 1(Item 1) | 1(Container 1) |
| Container 1 | 9,000 | 1(Item 2) | 2(Container 2,3) |
| Container 2 | 5,000 | 1(Item 3) | 0 |
| Container 3 | 2,500 | 1(Item 4) | 0 |

Fig. 8

| Container information | Example |
|---|---|
| Container ID | 1 |
| Upper rank container ID | 0 |
| Title | album 1 |
| @Size | 9,000 |
| @Item Count | 1 |
| @Container Count | 1 |

The @Size, @Item Count, @Container Count rows constitute Container attribute information.

Fig. 9

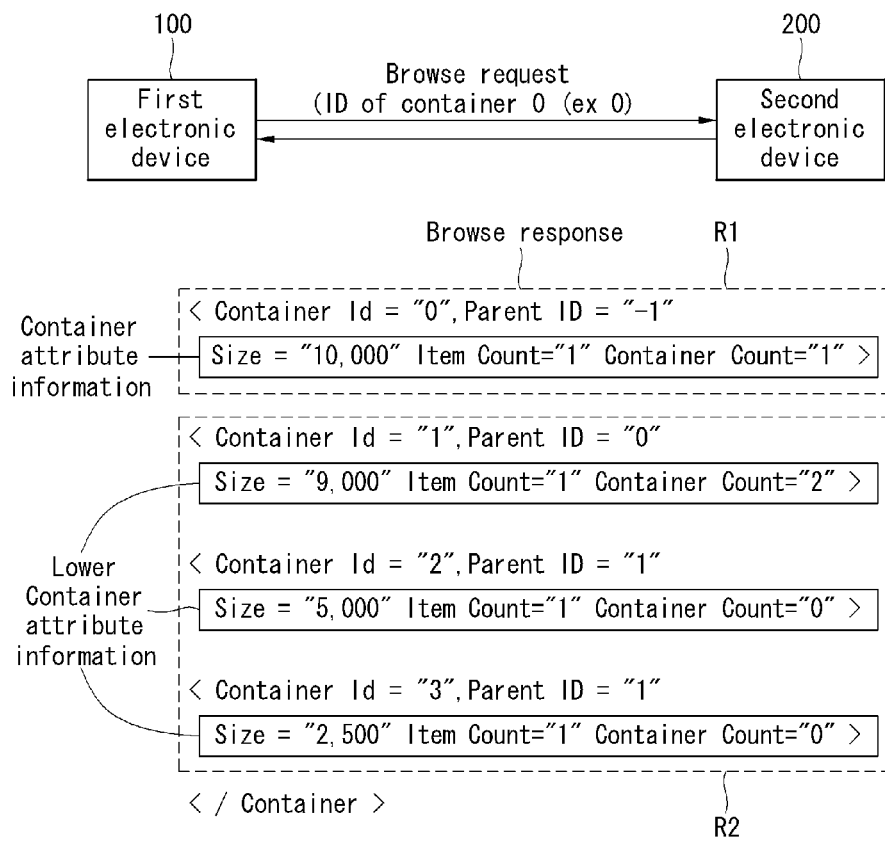

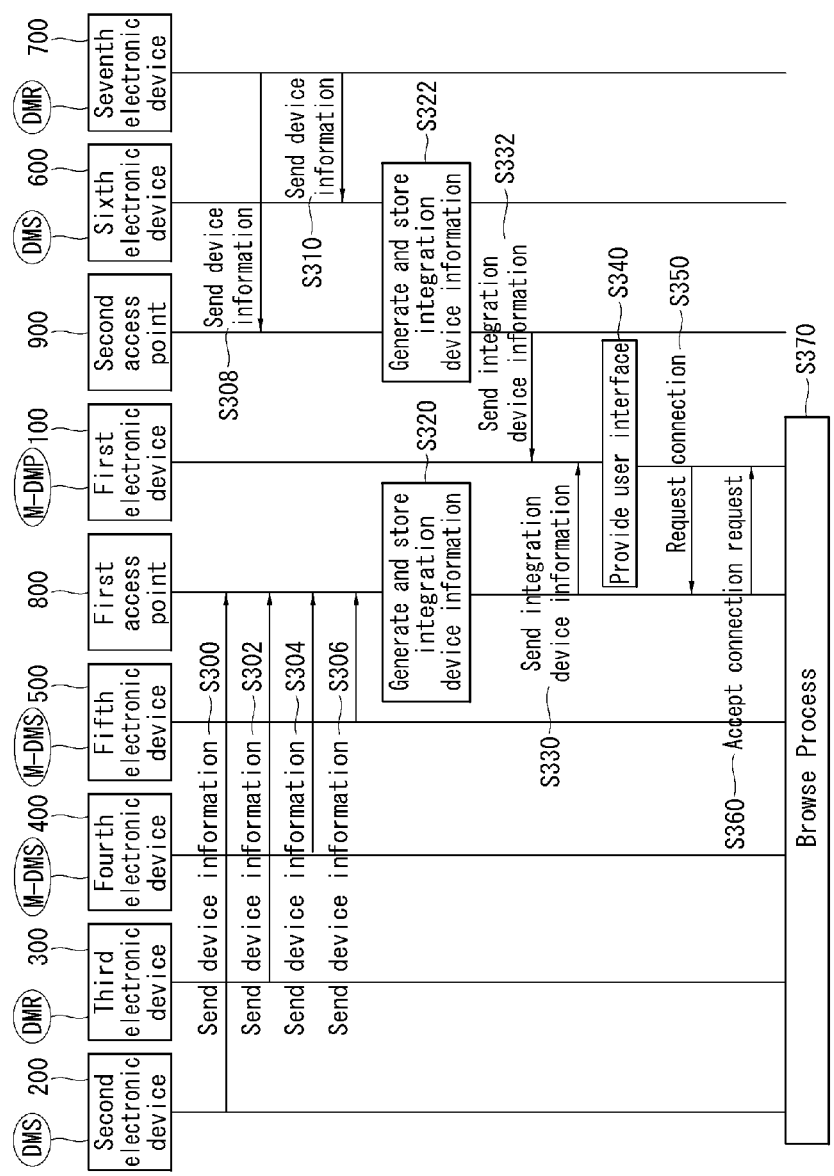

Fig. 13

| Identification name of second electronic device ||
|---|---|
| Device information | Example |
| Function | DMS |
| Type | Computer |
| Recently used time | 15 min. before |

(a)

| Identification name of third electronic device ||
|---|---|
| Device information | Example |
| Function | DMR |
| Type | TV |
| Recently used time | 5 min. before |

| AP information | First AP identification name<br>First AP access information(ex.SSID) ||
|---|---|---|
| Integration device information | Total number of DMSs : Three ||
| | Type of DMS :<br>    Second electronic device-Computer,<br>    Fourth electronic device-Mobile phone,<br>    Fifth electronic device-E-book ||
| | Total number of DMRs : One ||
| | Type of DMR : Third electronic device-TV ||
| | Recently used time :<br>Third electronic device-5 min. before ||

(a)

| AP information | Second AP identification name<br>Second AP access information(ex.SSID) ||
|---|---|---|
| Integration device information | Total number of DMSs : One ||
| | Type of DMS : Sixth electronic device-Computer ||
| | Total number of DMRs : One ||
| | Type of DMR : Seventh electronic device-Monitor ||
| | Recently used time :<br>Sixth electronic device-10 min. before ||

(b)

|  | Second electronic device | Fourth electronic device | Fifth electronic device |
|---|---|---|---|
| @Size | 10,000 | 5,000 | 3,000 |
| @Item Count | 1 | 2 | 2 |
| @Container Count | 1 | 2 | 2 |

Each container attribute information(a)

| @Size | 18,000 |
|---|---|
| @Item Count | 7 |
| @Container Count | 7 |

Integration container attribute information(b)

ELECTRONIC DEVICE AND OPERATING METHOD OF THE SAME

This Application is a 35 U.S.C. §371 National Stage Entry of International Application No. PCT/KR2011/000180, filed Jan. 11, 2011 and claims the benefit of U.S. Provisional Application Nos. 61/296,033, filed Jan. 19, 2010, 61/296,031, filed Jan. 19, 2010, and 61/390,615, filed Oct. 7, 2010, all of which are incorporated by reference in their entirety herein.

TECHNICAL FIELD

The present invention relates to an operating method of an electronic device constituting a network and, more particularly, to an electronic device and an operating method of the same, which are capable of more effectively configuring and managing a network.

BACKGROUND ART

Recently, active research is being done on a method of forming a local network between electronic devices and sharing contents stored in the electronic devices over the local network.

In line with this research trend, a method of configuring a network and more effectively managing and sharing contents belonging to the configured network needs to be researched.

DISCLOSURE OF INVENTION

Technical Problem

An object of the present invention is to provide an electronic device and an operating method of the same, which are capable of more effectively managing objects belonging to a network.

Another object of the present invention is to provide an electronic device and an operating method of the same, which are capable of more efficiently configuring a network.

The technical objects to be achieved by the present invention are not limited to the technical objects, and other technical objects to be achieved by the present invention will become evident to a person having ordinary skill in the art to which the present invention pertains from the following description.

Solution to Problem

According to a first aspect of the present invention, there is provided an operating method of an electronic device managing container information which is metadata for a container, including generating the container information, comprising at least one of a size of the container, the number of items included in the container, and the number of lower containers included in the container, and storing the generated container information; receiving a request message for container information related to a specific container from another electronic device; and sending a response message, comprising the container information of the specific container, to another electronic device as a response to the received request message.

According to a second aspect of the present invention, there is provided an operating method of an electronic device, including receiving a first device information, prior to connecting with a specific network, the first device information related to characteristic of at least one electronic device, belonging to a first network, from the first network, wherein the first device information comprises at least one of the number of electronic devices performing a predetermined function, and a type of the electronic device performing the predetermined function from among the one or more electronic devices belonging to the first network; receiving a second device information, prior to connecting with a specific network, the second device information related to characteristic of at least one electronic device, belonging to a second network, from the second network, wherein the second device information comprises at least one of the number of electronic devices performing a predetermined function, and a type of the electronic device performing the predetermined function from among the at least one electronic device belonging to the second network; and accessing a specific network selected based on the received first and second device information.

According to a third aspect of the present invention, there is provided an electronic device managing container information which is metadata for a container, including a communication unit for transmitting and/or receiving data; a control unit for generating container information, including at least one of a size of the container, the number of items included in the container, and the number of lower containers included in the container; and a memory unit for storing the generated container information. When a request message for container information related to a specific container is received from another electronic device through the communication unit, the control unit sends a response message including container information related to the specific container, stored in the memory unit, to the another electronic device in response to the received request message.

According to a fourth aspect of the present invention, there is provided an electronic device, including a communication unit for transmitting and/or receiving data and a control unit for, prior to connecting with a specific network, receiving first device information related to characteristic of at least one electronic device, belonging to a first network, from the first network, receiving second device information related to characteristic of one or more electronic devices, belonging to a second network, from the second network, and accessing a specific network selected based on the received first and second device information through the communication unit. The first device information comprises at least one of the number of electronic devices performing a predetermined function, and a type of the electronic device performing the predetermined function among the at least one electronic device belonging to the first network. The second device information comprises at least one of the number of electronic devices performing a predetermined function, and a type of the electronic device performing the predetermined function among the at least one electronic device belonging to the second network.

Advantageous Effects of Invention

According to the electronic device and the method of operating the same according to the present invention, objects belonging to a network can be managed more effectively.

According to the electronic device and the method of operating the same according to the present invention, a network can be configured more effectively.

Furthermore, according to the present invention, objects belonging to a network can be effectively managed, and a user is provided with a user interface for selecting a specific network in a condition in which a plurality of networks exists. Accordingly, the electronic device and the operating method of the same, capable of more effectively configuring and managing a network, can be provided.

BRIEF DESCRIPTION OF DRAWINGS

The above and other objects and features of the present invention will become apparent from the following description of preferred embodiments given in conjunction with the accompanying drawings, in which:

FIG. 4 is a flowchart illustrating a method of managing an object according to an embodiment of the present invention;

FIG. 5 is a diagram showing one kind of container attribute information according to an embodiment of the present invention;

FIG. 6 is a diagram showing an example of a tree structure of an object according to an embodiment of the present invention;

FIG. 7 is a diagram showing an example of container attribute information according to an embodiment of the present invention;

FIG. 8 is a diagram showing an example of container information according to an embodiment of the present invention;

FIG. 9 is a diagram showing an example of a browse process according to an embodiment of the present invention;

FIG. 12 is a flowchart illustrating a method of accessing an access point according to an embodiment of the present invention;

FIG. 13 is a diagram showing an example of device information according to an embodiment of the present invention;

FIG. 14 is a diagram showing an example of integration device information according to an embodiment of the present invention;

BEST MODE FOR CARRYING OUT THE INVENTION

Figure 1:
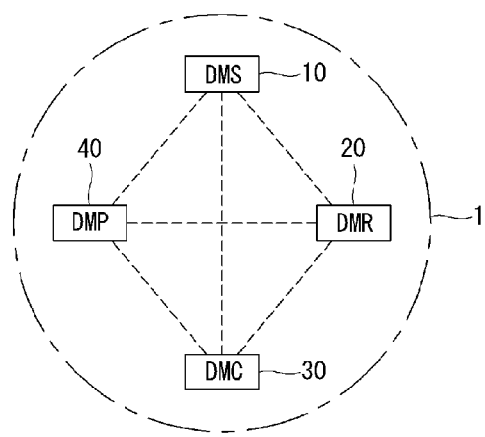
FIG. 1 is a diagram showing a system environment according to an embodiment of the present invention.

The above objects, characteristic, and merits of the present invention will become more apparent from the following detailed description taken in conjunction with the accompanying drawings. The present invention may be modified in various ways and may have some embodiments. Hereinafter, some exemplary embodiments of the present invention will be illustrated in the accompanying drawings and described in detail. The same reference numerals basically designate the same elements throughout the drawings. Furthermore, a detailed description of the known functions or elements pertinent to the present invention will be omitted if it is deemed to make the gist of this document unnecessarily vague. Numbers (for example, first and second) used in the course of a description of this specification are only identification symbols for distinguishing one element from the other element. Terms used in this specification are for only describing specific embodiments, and the scope of the present invention is not limited thereto.

FIG. 1 is a diagram showing a system environment according to an embodiment of the present invention.

The system environment according to the embodiment of the present invention may include a variety of network environments. For example, the system environment according to the embodiment of the present invention may be configured on the basis of Universal Plug and Play (UPnP) or Digital Living Network Alliance (DLNA) based on the UPnP. Here, the UPnP and the DLNA are examples of network protocols for contents sharing, so the technical spirit of the present invention is not limited to a specific network. It is hereinafter assumed that the system environment is a DLNA network.

Referring to FIG. 1, the DLNA network 1 of the system environment according to the embodiment of the present invention may include at least one of a Digital Media Server (DMS) 10, a Digital Media Renderer (DMR) 20, a Digital Media Controller (DMC) 30, and a Digital Media Player (DMP) 40.

The network 1 may include one or more of each of the DMS 10, the DMR 20, the DMC 30, and the DMP 40. The DLNA may provide a standard in which the DMS 10, the DMR 20, the DMC 30, and the DMP 40 are compatible with each other.

The DMS 10, the DMR 20, the DMC 30, and the DMP 40 may communicate with each other through a variety of communication means. For example, the DMS 10, the DMR 20, the DMC 30, and the DMP 40 may communicate with each other through at least one of Ethernet, Wi-Fi, and Bluetooth. The above communication means are only examples; so the DMS 10, the DMR 20, the DMC 30, and the DMP 40 may communicate with each other through other communication means.

Each of the components constituting the network 1 is described in more detail below.

The DMS 10 may manage digital media contents and provide media data. To this end, the DMS 10 may store and manage information related to various data (for example, contents, metadata for the contents, and information for container to manage the contents).

For example, data management service (for example, Contents Directory Service (CDS)) within the DMS 10 constructs object information based on contents files and container information.

The object information may generally refer to items having information related to media files (for example, still images, moving images, and audio files) and/or container information having information related to directory.

The object information may also be referred to as metadata. That is, the object information may refer to at least one of an item (that is, metadata for a media file) and container information (that is, metadata for a directory).

The object information may be written in a mark-up language, and it may include various pieces of information related to the associated contents.

For example, the object may include at least one of an identifier (referred to as an ID hereinafter) for its own identity, identification information for a container (that is, an upper container) to which the object belongs, a title, information indicating the object is an item or a container, a type of media, a protocol capable of acquiring associated contents (for example, a media file), and access location information.

More particularly, an item (that is, an example of the object) may include at least one of the ID (ex. 3-1-1) of the item for its own identity, container identification information (ex. 3-1) indicating that the item belongs to container of 3-1, a title (ex. Album 1 Photo. 1), protocol information (ex. http-get:*:image/jpeg), and access location information (ex. http://10.0.0.1/image/B-JPEG_M-11.jpg).

Here, an item may correspond to one contents file or a plurality of contents files. For example, a plurality of contents files having the same contents, but different bit rates may be managed as one item.

Container information (that is, an example of the object) may include at least one of an ID (ex. 3-1) for identifying a container, identification information (ex. 3) for identifying an upper container of the container, and a title (album 1). The container information may include information related to an item belonging to the container.

Thus, contents and containers stored in the DMS 10 may be managed by the object.

The DMS 10 may receive various commands from the DMC 30 and perform the commands. For example, when a browse command is received from the DMC 30, the DMS 10 may send managed object information to the DMC 30. When a play command is received from the DMC 30, the DMS 10 may stream contents to the DMR 20 so that the corresponding contents are outputted from a specific DMR 20.

The DMS 10 may include, for example, a PC, a Personal Video Recorder (PVR), and a set-top box.

The DMS 10 may be located inside or outside a home network. That is, the physical location of an apparatus for providing contents is not limited to a home network.

The DMR 20 may render contents. The DMR 20 may play contents received from the DMS 10. The DMR 20 may include, for example, TV, a monitor, DTV, and a digital photo frame.

The DMC 30 may provide a control function. For example, the DMC 30 may control various devices within the network 1.

The DMP 40 may refer to an electronic device capable of performing both the functions of the DMR 20 and the DMC 30.

The DMS 10, the DMR 20, the DMC 30, and the DMP 40 may be terms which functionally distinguish electronic devices. For example, in the case where a mobile phone has not only a control function, but also a rendering function, the mobile phone may correspond to the DMP 40. In the case where DTV manages contents, the DTV may correspond to the DMS 10. This is described in detail with reference to FIG. 2.

Figure 2:
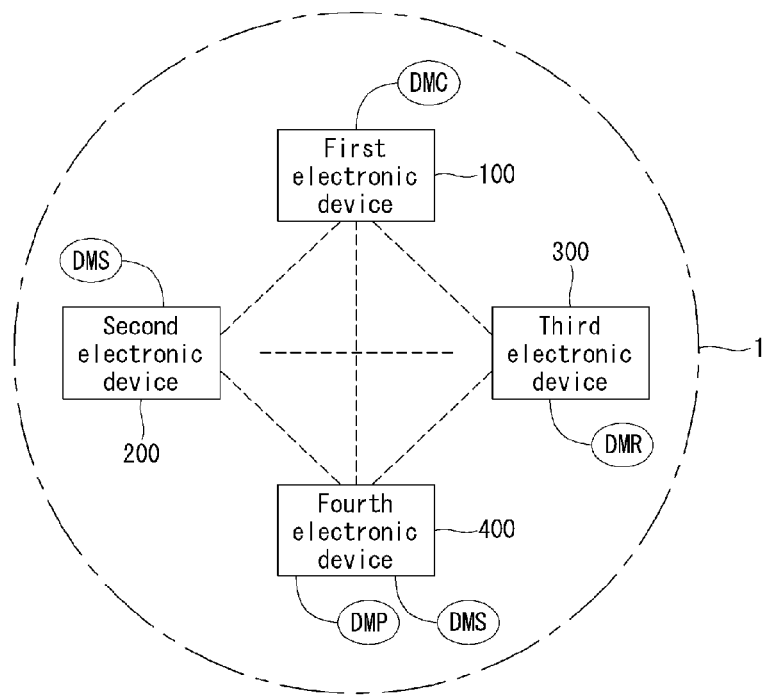
FIG. 2 is a diagram showing a system environment according to a second embodiment of the present invention.

FIG. 2 is a diagram showing a system environment according to a second embodiment of the present invention.

Referring to FIG. 2, a network 1 includes first to fourth electronic devices 100, 200, 300, and 400. The network 1 may include electronic devices fewer or larger than the first to fourth electronic devices.

It is hereinafter assumed that the first electronic device 100 performs the function of the DMC described above with reference to FIG. 1. In other words, the first electronic device 100 may perform a function of controlling various electronic devices.

It is assumed that the second electronic device 200 performs the function of the DMS described above with reference to FIG. 1. That is, the second electronic device 200 may manage various data (for example, contents and objects information).

It is assumed that the third electronic device 300 performs the function of the DMR described above with reference to FIG. 1. That is, the third electronic device 300 may provide a function of outputting contents.

It is assumed that the fourth electronic device 400 performs the functions of the DMP and DMS described above with reference to FIG. 1. In other words, the fourth electronic device 400 may perform a contents output function, a control function, and a function of managing various data.

Hereinafter, the first electronic device 100 is described in more detail with reference to the accompanying drawings. It is to be noted that the suffixes of elements used in the following description, such as 'module' and 'unit,' are assigned or mixed in use by taking only the easy of writing this specification into consideration, but are not particularly given importance and roles.

Figure 3:
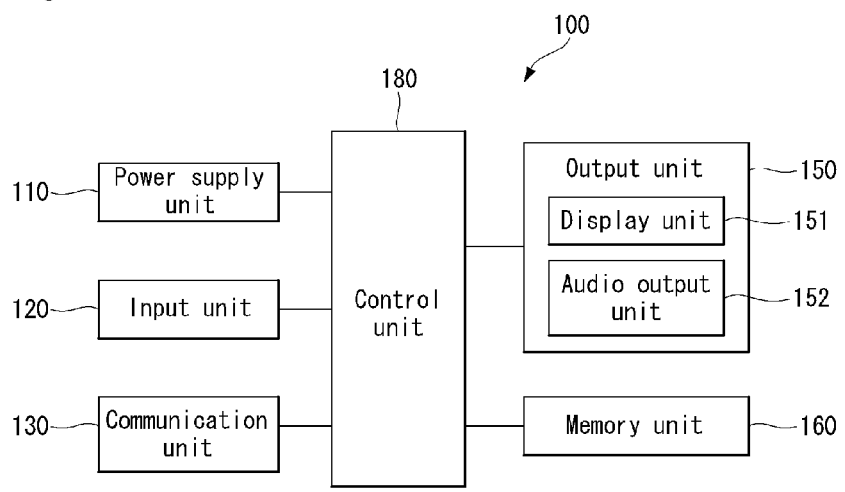
FIG. 3 is a block diagram showing the construction of a first electronic device 100 according to an embodiment of the present invention.

FIG. 3 is a block diagram showing the construction of the first electronic device 100 according to an embodiment of the present invention.

The first electronic device 100 may include a power supply unit 110, an input unit 120, a communication unit 130, an output unit 150, a memory unit 160, and a control unit 180. The construction is not an indispensable construction, and the first electronic device 100 including larger or fewer elements than the above elements may be implemented. For example, the first electronic device 100 may not include the output unit 150 in the case where it performs only the function of the DMC.

The power supply unit 110 supplies power for the operations of elements constituting the first electronic device 100.

The input unit 120 may receive an audio signal, a video signal, and user input from a user.

The communication unit 130 may include one or more modules for performing communication with other electronic devices. The communication unit 130 may include not only the existing communication means, but also communication means to be used in the future.

The output unit 150 generates outputs relevant to a sight sense, an auditory sense, or a tactile sense and may include a display unit 151, an audio output unit 152 and so on.

The output unit 150 may further include a haptic module (not shown) for generating output (for example, vibration) relevant to a tactile sense.

The display unit 151 may display and output information processed by the first electronic device 100.

The display unit 151 may include at least one of a liquid crystal display (LCD), a thin film transistor liquid crystal display (TFT LCD), an organic light-emitting diode (OLED), a flexible display, and a 3D display.

Two or more display units 151 may exist according to an implementation form of the first electronic device 100.

The audio output unit 152 outputs externally received audio data or audio data generated by the first electronic device 100. That is, the audio output unit 152 may output an audio signal relevant to a function performed in the first electronic device 100. The audio output unit 152 may include a speaker, a buzzer or the like. The audio output unit 152 may output audio through an earphone jack. A user may connect earphones to the earphone jack and listen to audio outputted from the audio output unit 152.

The memory 160 may store programs for the operations of the first electronic device 100 and temporarily or permanently store inputted, outputted, and generated data (for example, contents, object information, and device information).

The memory 160 may include at least type of a storage medium, such as a flash memory type, a hard disk type, a multimedia card micro type, card type memory (for example, SD memory or XD memory), random access memory (RAM), static random access memory (SRAM), read-only memory (ROM), electrically erasable programmable read-only memory (EEPROM), programmable read-only memory (PROM), magnetic memory, a magnetic disk, and an optical disk.

The memory 160 may separately exist outside the first electronic device 100.

The control unit 180 may control the general operation of the first electronic device 100.

A variety of embodiments described in this specification may be implemented in a medium readable by a computer or a similar device using, for example, software or hardware or a combination them.

According to hardware implementations, the embodiments described in this specification may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing functions.

According to software implementations, embodiments, such as procedures or functions, may be implemented with a separate software module for performing at least one function or operation. Software codes may be implemented by a software application written in any suitable programming language. The software codes may be stored in the memory unit 160 and may be executed by the control unit 180.

The construction of the first electronic device 100 has been described with reference to FIG. 3. Each of the second to fourth electronic devices 200, 300, and 400 shown in FIG. 2 may include elements corresponding to those of the first electronic device 100.

For example, although not shown, the second electronic device 200 may include at least one of a power supply unit 210, an input unit 220, a communication unit 230, an output unit 250, a memory unit 260, and a control unit 280 corresponding to the elements of the first electronic device 100.

Although not shown, each of various electronic devices 300, 400, 500, 600, 700, 800, and 900 to be described in this specification may include elements corresponding to the elements of the first electronic device 100 in the same way as the second electronic device 200.

A method of managing object according to an embodiment of the present invention is described in detail below with reference to the environments and the devices described and shown in FIGS. 1 to 3. The description of embodiments of the present invention with reference to FIGS. 1 to 3 is only for convenience of description; so the technical spirit of the present invention is not limited to a specific environment or a specific device.

Figure 10:
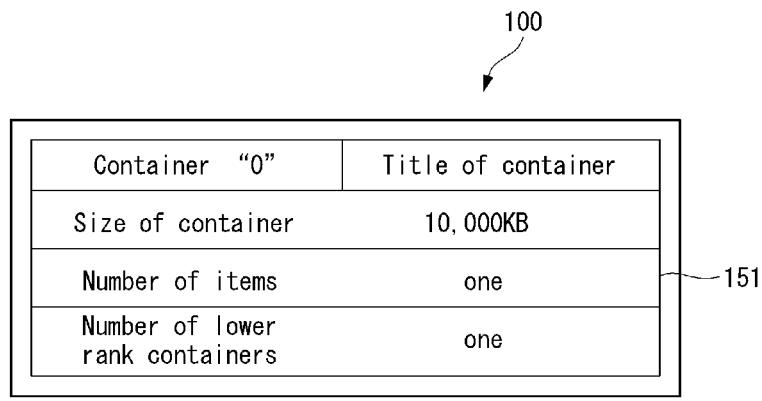
FIG. 10 is a diagram showing an example of browse results according to an embodiment of the present invention.

FIG. 4 is a flowchart illustrating a method of managing object according to an embodiment of the present invention. FIG. 5 is a diagram showing one kind of container attribute information according to an embodiment of the present invention. FIG. 6 is a diagram showing an example of a tree structure of object according to an embodiment of the present invention. FIG. 7 is a diagram showing an example of container attribute information according to an embodiment of the present invention. FIG. 8 is a diagram showing an example of container information according to an embodiment of the present invention. FIG. 9 is a diagram showing an example of a browse process according to an embodiment of the present invention. FIG. 10 is a diagram showing an example of browse results according to an embodiment of the present invention.

Referring to FIG. 4, the second electronic device 200 may generate and store container information at step S100.

The second electronic device 200, as shown in FIG. 2, may perform the function of the DMS 10. That is, the second electronic device 200 may generate and store object information (that is, metadata for managing contents). In particular, the second electronic device 200 may generate and store container information (that is, a kind of the object information).

The container information may refer to metadata for the container. As described above, the container information may include at least one of, for example, an ID for identifying a container, identification information for identifying an upper container of the container, and a title.

In addition, the container information may include an item belonging to the container. For example, the container information may further include the ID of each item.

The container information may further include container attribute information. The container attribute information may provide more detailed information related to a specific container.

As shown in FIG. 5, the container attribute information may include information related to at least one of a size of a container, the number of items within the container, and the number of lower containers within the container. The container attribute information may provide a user with more detailed information related to a specific container by more effectively managing the information related to the container.

The container attribute information may be included container information as described above, but may be managed as separate metadata from the container information. In this case, association information for associating the container attribute information and the container information may be included in each of the container attribute information and the container information. It is assumed that the container attribute information is included in the container information hereinafter.

The container information is described in more detail below.

FIG. 6 is a diagram showing an example of a tree structure of object according to an embodiment of the present invention.

From FIG. 6, it can be seen that a container 1 and an item 1 are included in the lower rank of a container 0 (that is, the highest rank container), containers 2 and 3 and an item 2 are included in the lower rank of the container 1, an item 3 is included in the container 2, and an item 4 is included in the container 3.

FIG. 7 is a diagram showing an example of container attribute information included in respective container information, according to the container tree structure shown in FIG. 6.

That is, FIG. 7 illustrates container attribute information included in the container information of the respective containers shown in FIG. 6. As shown in FIG. 7, the container 0 may be 10,000 in the size of a container, 1 in the number of items (item1) within the container 0, and 1 in the number of containers (container 1) within the container 0 as container attribute information. As shown in FIG. 7, each of the container 1 to the container 3 may include container attribute information comparable to the container 0.

Unlike the above, information related to the number of items included in the container attribute information may refer to not only items included in a container, but also the total number of items included in lower containers. For example, the number of items included in the container 0 may be 4 (that is, the total number of items included in the lower containers).

According to the embodiment of the present invention, the second electronic device 200 may generate and store container attribute information.

FIG. 8 is a diagram showing an example of container information according to an embodiment of the present invention. FIG. 8 shows an example of container information including the above-described container attribute information and shows container information for the container 1 shown in FIGS. 6 and 7.

Referring to FIG. 8, the information of the container 1 may include at least one of a container ID, an upper container ID, a title, and container attribute information.

Although not shown, the information of the container 1 may further include the IDs of lower containers of the container 1. That is, the information of the container 1 may further include the IDs of the containers 2 and 3 as the IDs of lower containers of the container 1. Accordingly, the container 1 may be linked with the lower containers 2 and 3 of the container 1.

The second electronic device 200 may generate the above-described container information in advance. Meanwhile, the second electronic device 200 may update the container information automatically or manually in the case where there is a change in the container information.

Referring back to FIG. 4, a connection may be established between the first electronic device 100 and the second electronic device 200 at step S110.

For example, a connection may be established between the first electronic device 100 and the second electronic device 200 through Wi-Fi.

The first electronic device 100 may send a browse request message to the second electronic device 200 at step S120.

More particularly, the first electronic device 100 may request browse from the second electronic device 200 in order to obtain information related to contents managed by the second electronic device 200.

The first electronic device 100 may receive a container that a user wants to search for, insert an ID of the received container in the browse request, and send the browse request to the second electronic device 200.

When the browse request is received from the first electronic device 100, the second electronic device 200 may send object information related to a container corresponding to the container ID, received from the first electronic device 100, to the first electronic device 100. This is described in more detail below with reference to FIG. 9.

FIG. 9 is a diagram showing an example of a browse process according to an embodiment of the present invention.

Referring to FIG. 9, the first electronic device 100 may request browse from the second electronic device 200. The browse request message may include the ID of a target container that the first electronic device 100 will browse. In the case where all containers are browsed, the browse request message may include a root container ID. In the present embodiment, the root container is assumed to be the container 0.

The second electronic device 200 may determine whether there is container information corresponding to the requested container ID from among objects managed by the second electronic device 200.

If, as a result of the determination, a container corresponding to the requested container ID is determined not to exist, the second electronic device 200 may send an error message to the first electronic device 100. The error message may include information indicating that a container corresponding to the container ID requested by the first electronic device 100 does not exist. When the error message is received from the second electronic device 200, the first electronic device 100 may provide a user interface for providing a user with information indicating that a container corresponding to the requested container ID does not exist.

Meanwhile, the second electronic device 200 may determine that a container corresponding to the container ID requested by the first electronic device 100 exists. For example, in the case where a container ID included in the browse request message is '0', the second electronic device 200 may determine whether container information having a container ID '0' exists. If container information having the container ID '0' exists, the second electronic device 200 may acquire the container information having the container ID '0'.

The second electronic device 200 may generate a browse response message on the basis of the acquired container information.

For example, the second electronic device 200 may include container attribute information, identified by the container ID '0', in the browse response message.

As shown in R1 of FIG. 9, the browse response message may include the container attribute information corresponding to the container ID '0' (for example, information related to at least one of the size of a container, the number of items, and the number of lower containers).

The browse response message, as shown in R1 of FIG. 9, may further include information related to at least one of a container ID and an upper container ID. In other words, the browse response message may further include container information other than the container attribute information.

For example, the second electronic device 200 may record attribute information related to the lower container of a browsed container having the container ID '0' in the browse response message.

As shown in R2 of FIG. 9, the browse response message may include container attribute information related to containers 1 to 3 (that is, the lower containers of the browsed container having the container ID '0').

In generating the browse response message, the second electronic device 200 may determine whether to record the attribute information of the lower container in the browse response message on the basis of a specific field included in the browse request message. For example, in the case where the browse request message includes information requesting both a container ID '0' and attribute information of a lower container, the second electronic device 200 may include container attribute information, corresponding to the container ID '0', and attribute information related to lower containers of the container ID '0' in the browse response message.

Since the browse response message further includes the lower container attribute information R2, more detailed information related to lower container may be provided to a browse requester.

In other words, the browse response message may basically include the information shown in R1 of FIG. 9 and further include the information shown in R2 of FIG. 9.

Although not shown, the region R1 shown in FIG. 9 may further include information related to at least one of the title of a container, a container ID, and an upper container ID of the container. The region R1 shown in FIG. 9 may include information (for example, at least one of an ID of the item, container identification information indicating that the item belongs to which container, a title of the item, protocol information of the item, and access location information of the item) related to an item belonging to a container '0'.

Although not shown, the region R2 shown in FIG. 9 may further include information related to at least one of the title of each of lower containers, an ID of each lower container, and an upper container ID of each lower container).

Like the region R1 of FIG. 9, the region R2 of FIG. 9 may further include information (for example, at least one of an ID of the item, container identification information indicating that the item belongs to which container, a title of the item, protocol information of the item, and access location information of the item) related to an item belonging to each lower container.

Accordingly, the browse response message may provide more detailed browse results to a browse request device.

Referring back to FIG. 4, the second electronic device 200 may send the generated browse response message to the first electronic device 100 at step S130.

The first electronic device 100 may output browse results on the basis of the browse response message received from the second electronic device 200 at step S140.

In other words, the first electronic device 100 may provide browse information to a user by outputting the browse results through the output unit 150.

FIG. 10 is a diagram showing an example of browse results according to an embodiment of the present invention.

As shown in FIG. 10, the first electronic device 100 may output browse results. FIG. 10 is a diagram showing an example of browse results which may be generated according to the browse request and response messages shown in FIG. 9. That is, when the information shown in R1 of FIG. 9 is received from the second electronic device 200, the first electronic device 100 may output the browse results shown in FIG. 10.

Accordingly, a user may easily know the size of a container '0', the number of items, and the number of lower containers.

Although not shown, when outputting the browse results on the basis of the browse response message received from the second electronic device 200, the first electronic device 100 may also output the title of an item (that is, the title of an item 1) belonging to a container corresponding to the container ID '0'. To this end, the first electronic device 100 may acquire title information related to the item 1 through the browse response message received from the second electronic device 200.

Although not shown, when outputting the browse results, the first electronic device 100 may output container information (for example, at least one of an ID of a lower container of the browsed container, a title of the lower container, each upper container ID, attribute information related to the lower container of the browsed container, and item information belonging to the lower container) related to the lower container belonging to the browsed container corresponding to the container ID '0'.

The first electronic device 100 may output the browse results step-by-step. For example, the first electronic device 100 may primarily output the title or ID of a lower container. When a user selects the title or ID of the outputted lower container, the first electronic device 100 may secondarily output at least one of container information related to the selected lower container and item information belonging to the lower container. Here, as described above, the container information includes container attribute information.

According to the embodiment of the present invention, since container attribute information is managed, more abundant information related to a container can be provided to a user. Furthermore, container attribute information can be provided to a user more rapidly because it is managed.

Hereinafter, A method of an electronic device accessing an access point according to an embodiment of the present invention is described with reference to relevant drawings.

Figure 11:
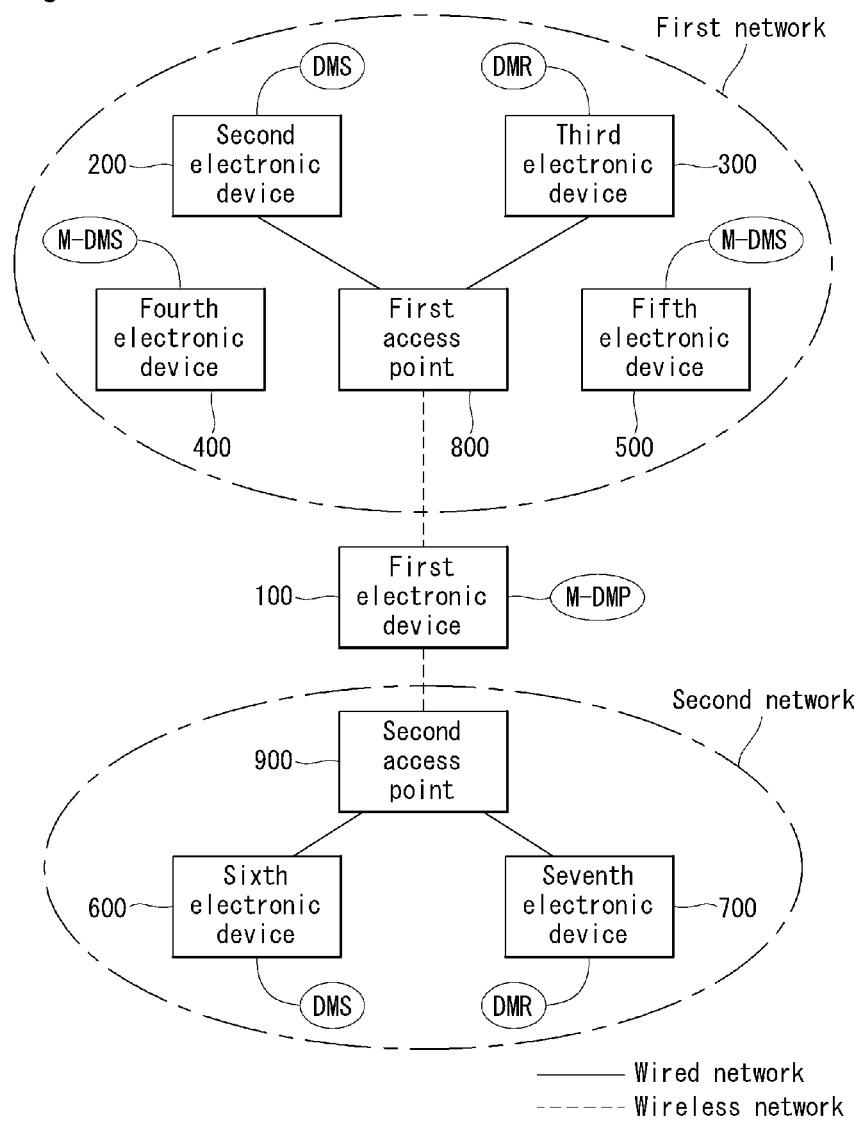
FIG. 11 is a diagram showing a system environment illustrating a method of an electronic device accessing an access point according to an embodiment of the present invention.

FIG. 11 is a diagram showing a system environment illustrating a method of an electronic device accessing an access point according to an embodiment of the present invention.

FIG. 11 shows that a plurality of networks (for example, a first network and a second network) is formed within a certain local network.

The first network shown in FIG. 11 includes a first access point 800, a second electronic device 200, a third electronic device 300, a fourth electronic device 400, and a fifth electronic device.

The first access point 800 may refer to a device for establishing wired and wireless connections between electronic devices. An access point (the first access point 800 and a second access point 900) described in the present invention is an intermediate node for connecting various electronic devices (for example, DLNA electronic devices), and it may have a Mobile-Network Connection Function (M-NCF).

The first access point 800 may provide information to an electronic device trying to newly access a network. For example, the first access point 800 may provide information related to an electronic device connected to the first access point 800 (hereinafter referred to as device information) to an electronic device trying to newly access a network. An electronic device trying to newly access a network may determine whether to access the first access point 800 by receiving the device information. The device information will be described in detail later.

The second electronic device 200, the third electronic device 300, the fourth electronic device 400, and the fifth electronic device 500 belonging to the first network may perform communication through the first access point 800. That is, the second electronic device 200, the third electronic device 300, the fourth electronic device 400, and the fifth electronic device 500 may communicate with each other within the same network.

Meanwhile, the second network shown in FIG. 11 includes the second access point 900, a sixth electronic device 600, and a seventh electronic device 700. The sixth electronic device 600 and the seventh electronic device 700 may communicate with each other through the second access point 900.

A first electronic device 100 shown in FIG. 11 may refer to an electronic device trying to newly access a network. The first electronic device 100 shown in FIG. 11 refers to a mobile DMP (M-DMP) and may refer to, for example, a portable phone, a smart phone, an e-book, or a notebook.

The first electronic device 100 may subscribe to the first network or the second network.

For example, the first electronic device 100 may subscribe to the first network by accessing the first access point 800 or may subscribe to the second network by accessing the second access point 900.

Hereinafter, a method of the first electronic device 100 more conveniently access to any one of the first network and the second network on the basis of the device information is described. The method of the first electronic device 100 determining access to any one of the first network and the second network is only an example. The present embodiment may also be applied to a case where the first electronic device 100 selects and accesses any one of two or more local networks.

The method of accessing an access point according to an embodiment of the present invention is described below with reference to the system environment shown in FIG. 11. Reference to FIG. 11 is only for convenience of description, and the technical scope of the present invention is not limited to a specific system environment.

FIG. 12 is a flowchart illustrating a method of accessing an access point according to an embodiment of the present invention.

Referring to FIG. 12, the method of accessing an access point according to the embodiment of the present invention may include a device information acquisition process S300 to S322, a device information providing process S330 to S340, and a connection establishment process S350 to S370.

Each of the processes is shortly described below. In the device information acquisition process, the first access point 800 and the second access point 900 may acquire device information from their electronic devices belonging to the respective networks. In the device information providing process, the first access point 800 and the second access point 900 may send the acquired device information to an electronic device trying to newly access the network (for example, the first electronic device 100). In the connection establishment process, the first electronic device 100 may determine that it will enter which network on the basis of the received device information. Each of the processes is described in more detail below.

The first network formed by the first access point 800 is chiefly described below, for convenience of description. This description may also be applied to second network formed by the second access point 900.

In the device information acquisition process, the first access point 800 and the second access point 900 acquire device information from a electronic device connected to thereto. More particularly, the first access point 800 may acquire device information from each of the second electronic device 200, the third electronic device 300, the fourth electronic device 400, and the fifth electronic device 500 which belong to the first network formed at steps S300 to S306.

Likewise, the second access point 900 may acquire device information from each of the sixth electronic device 600 and the seventh electronic device 700 which belong to the second network formed by the second access point 900 at steps S308 and S310.

The device information described in this specification may include any information related to the characteristic of an electronic device. The device information may include at least one of, for example, the function of an electronic device, a type of the electronic device, and information related to the time when a user has used the electronic device most recently. Each of the pieces of information is described in more detail below.

The function of the electronic device may refer to a function that is performed by each electronic device. Referring to FIG. 13, the function of the second electronic device 200 is a DMS, the function of the third electronic device 300 is a DMR, and the functions of the fourth electronic device 400 and the fifth electronic device 500 are an M-DMS. Here, the M-DMS may refer to a mobile-DMS. The function of the sixth electronic device 600 may be a DMS, and the function of the seventh electronic device 700 may be a DMR.

The function of the electronic device is not limited to the DMS, the DMR, the DMC, and the DMP and may be more various. For example, a type of the electronic device may be a printer, a vehicle, or a copy machine.

The type of the electronic device may refer to the device type of each electronic device. In other words, even in the case where the function of an electronic device is a DMS, the type of a certain electronic device may be a computer and the type of a certain electronic device may be a Network Attached Storage (NAS).

It is hereinafter assumed that the type of the second electronic device 200 is a computer, the type of the third electronic device 300 is TV, the type of the fourth electronic device 400 is a mobile phone, the type of the fifth electronic device 500 is an e-book, the type of the sixth electronic device 600 is a computer, and the type of the seventh electronic device 700 is a computer, more particularly, the monitor of the computer.

The information related to the time when a user has used the electronic device most recently refers to information related to an electronic device that has been used most recently. For example, the information may be a point of time at which a user has played back contents most recently.

The device information may further include an electronic device identification name to identify device information related to an electronic device.

The device information may further include information related to the time when the device information has been generated. The first access point 800 may determine whether received device information has been updated or is related to a new electronic device on the basis of the time when the device information has been generated.

FIG. 13 is a diagram showing an example of the device information according to an embodiment of the present invention.

FIG. 13(*a*) shown on the upper side of FIG. 13 shows an example of device information related to the second electronic device 200, and FIG. 13(*b*) shown on the lower side of FIG. 13 shows an example of device information related to the third electronic device 300.

Although not shown in FIGS. 13(*a*) and 13(*b*), the device information may further include information related to the time when the device information has been generated as described above.

The first access point 800 may acquire the device information from the second to fifth electronic devices 200, 300, 400, and 500 on a regular basis or whenever the device information is changed.

The first access point 800 may compare acquired device information and the existing device information. If, as a result of the comparison, the acquired device information is newer than the existing device information, the first access point 800 may store the acquired device information. If, as a result of the comparison, the acquired device information is the existing device information and contains different information from the existing device information, the first access point 800 may update the existing device information.

According to the above embodiment, the first access point 800 may acquire device information related to each of the electronic devices 200, 300, 400, and 500 which are included in the first network.

The second access point 900 may also acquire device information related to each of the sixth and seventh electronic devices 600 and 700 which are included in the second network.

Referring back to FIG. 12, the first access point 800 may generate integration device information and maintain the generated integration device information at step S320.

The integration device information may refer to information integrating each of the device information related to the second to fifth electronic devices 200, 300, 400, and 500 connected to the first access point 800.

For example, the integration device information may include information related to at least one of the total number of DMSs, the total number of DMRs, the type of each DMS, the type of each DMR, and the recently used time.

For example, the first access point 800 may generate the integration device information by integrating pieces of device information acquired from the second to fifth electronic devices.

FIG. 14 is a diagram showing an example of integration device information according to an embodiment of the present invention.

FIG. 14(*a*) shown on the upper side of FIG. 14 shows an example of integration device information generated by the first access point 800, and FIG. 14(*b*) shown on the lower side of FIG. 14 shows an example of integration device information generated by the second access point 900.

As shown in FIG. 14, the integration device information may include information related to at least one of the total number of electronic devices performing specific functions, the types of the electronic devices performing specific functions, and the recently used time.

The integration device information of FIG. 14(*a*) may further include access point information related to the first access point 800, and the integration device information of FIG. 14(*b*) may further include access point information related to the second access point 900. Here, the access point information may be an identifier (ID) for identifying an access point.

That is, the first access point 800 may generate the integration device information on the basis of the device information acquired from the second to fifth electronic devices 200, 300, 400, and 500, and associate the generated integration device information with the access point information related to the first access point 800.

If the device information is changed, the first access point 800 may modify the generated integration device information as described above.

As in step S320, the second access point 900 may also generate integration device in—formation and store the generated integration device information at step S322.

The first access point 800 may provide the generated integration device information to an electronic device which newly enters the network at step S330.

In other words, the first access point 800 may send the generated integration device information to the first electronic device 100 which newly enters the network.

The first access point 800 may send the integration device information to the first electronic device 100 trying to newly access the network in a broadcast method. For example, the first access point 800 may insert the integration device information in a beacon signal and send the beacon signal to the first electronic device 100.

In other words, the beacon signal may include the integration device information. That is, the beacon signal may include information related to at least one of the total number of DMSs, the type of each DMS, the total number of DMRs, the type of each DMR, and the recently used time.

The beacon signal may further include identification information related to the first access point 800, indicating that the beacon signal has been sent by the first access point 800. The beacon signal may further include information necessary for an electronic device that has received the beacon signal to access the first access point 800 such as a Service Set Identifier (SSID).

In some embodiments, when a signal to query whether there is an access point is received from the first electronic device 100, the first access point 800 may send in—tegration device information to the first electronic device 100 in response to the query signal. The response to the query signal may include information included in the above beacon signal.

Accordingly, the first electronic device 100 trying to newly access a network may obtain information related to the first network in the state in which it is not connected to the first network. That is, the first electronic device 100 may obtain information related to the first network before connected to the first network.

Meanwhile, as in step S330, the second access point 900 may also send the in—tegration device information, generated by the second electronic device 200, to the first electronic device 100 at step S332.

When the integration device information is received, the first electronic device 100 may provide a user interface at step S340.

The user interface may provide a user with information for access to any one of the first access point 800 and the second access point 900. To this end, the first electronic device 100 may generate the user interface on the basis of the integration device in—formation received from the first access point 800 and the second access point 900.

That is, the user interface may include integration device information and may further include access point information associated with the integration device in—formation. The access point information may be, for example, the identification name of an access point.

The first electronic device 100 may output the user interface timely. For example, when integration device information is received or there is a request from a user, the first electronic device 100 may output the user interface.

For example, when a beacon signal including the integration device information is received, the first electronic device 100 may generate a user interface on the basis of the integration device information and output the generated user interface.

Figure 15:
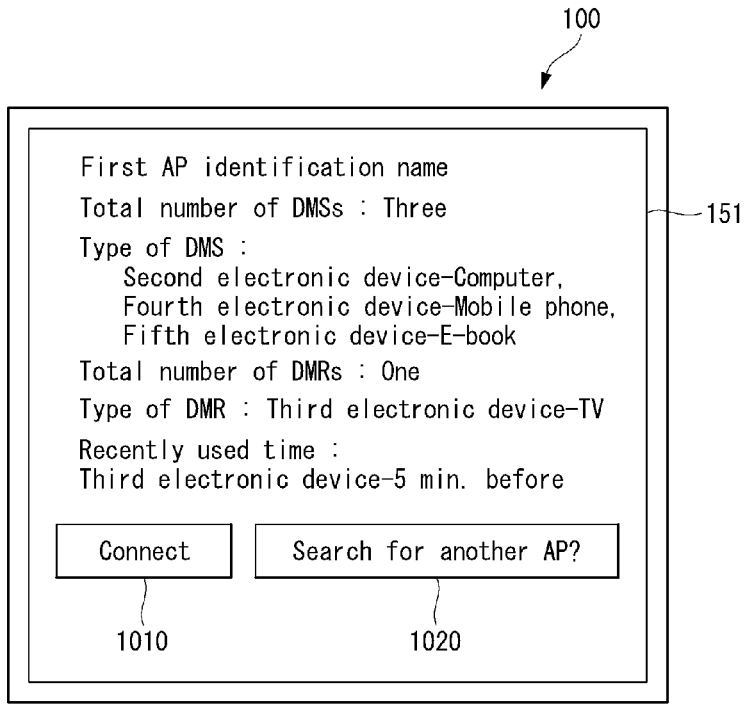
FIG. 15 is a diagram showing a first example of a user interface according to an embodiment of the present invention.

The first electronic device 100 may receive integration device information from each of the first access point 800 and the second access point 900 and output a user interface based on the integration device information (refer to FIG. 15).

Figure 16:
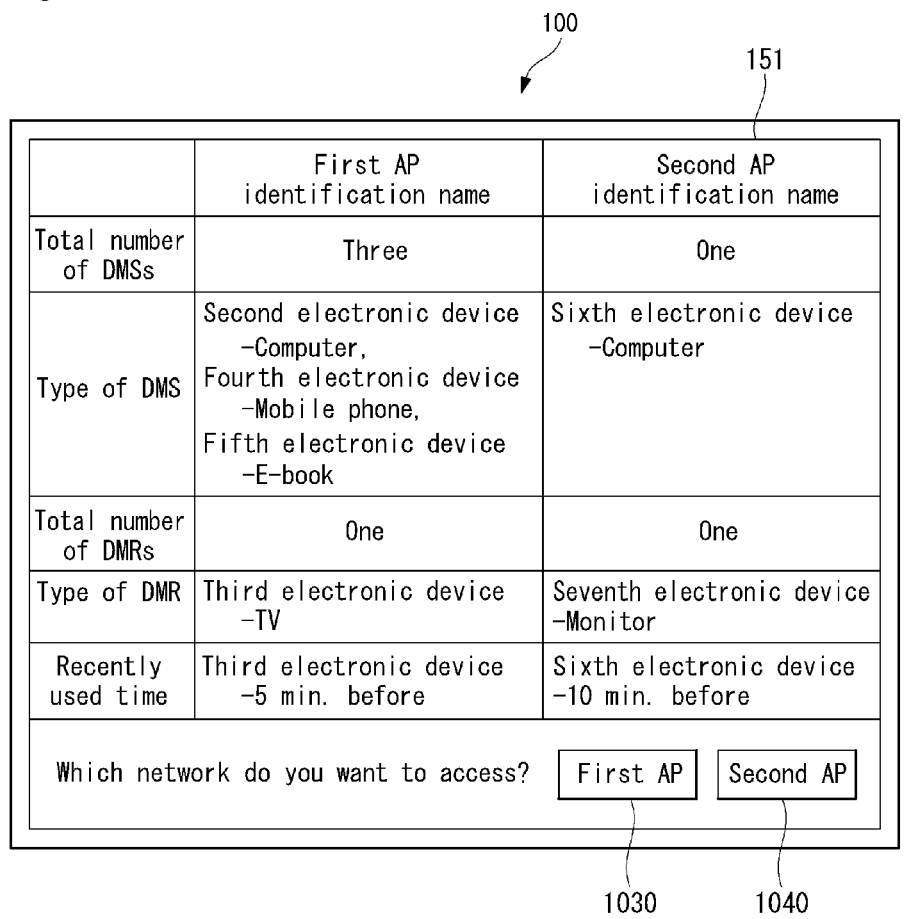
FIG. 16 is a diagram showing a second example of a user interface according to an embodiment of the present invention.

In some embodiments, the first electronic device 100 may generate a single user interface on the basis of the integration device information received from the first access point 800 and the second access point 900 and output the generated single user interface (refer to FIG. 16).

FIG. 15 is a diagram showing a first example of a user interface according to an embodiment of the present invention.

FIG. 15 shows a case where the first electronic device 100 separately outputs the user interface for the first access point 800 and the user interface for the second access point 900 as described above. For example, the case of FIG. 15 may correspond to a case where the first electronic device 100 separately receives beacon signals from the first access point 800 and the second access point 900.

It is hereinafter assumed that the first electronic device 100 receives a beacon signal or a response message (that is, a response to a query message to query whether there is an access point), including integration device information, from the first access point 800 ahead of the second access point 900.

When a signal (for example, a beacon signal or a response message) including the in—tegration device information is received from the first access point 800, the first electronic device 100 may output the user interface for the first access point 800.

FIG. 15 shows a user interface outputted from the first electronic device 100 through the display unit 151.

As shown in FIG. 15, the user interface may include information (for example, in—tegration device information) related to electronic devices connected to the first access point 800.

A user may determine whether to connect the first electronic device 100 to the first access point 800 on the basis of information displayed in the user interface of FIG. 15.

If the user wants to connect the first electronic device 100 to the first access point 800, a connection with the first access point 800 may be established by selecting a button 1010 corresponding to 'connection' shown in FIG. 15. That is, the first electronic device 100 may subscribe to the first network.

Unlike the above, the user may search for another access point. That is, the user may select a button 1020 corresponding to 'search for another access point' shown in FIG. 15 in order to determine whether there is another access point other than the first access point 800.

In this case, the first electronic device 100 may acquire integration device in—formation related to electronic devices, belonging to the second network, from the second access point 900. To this end, the first electronic device 100 may send a query message to query whether there is an access point. When the query message is received from the first electronic device 100, the second access point 900 may send the generated integration device information to the first electronic device 100.

At this time, the first access point 800 may also send the integration device information to the first electronic device 100. Since the first electronic device 100 has already outputted the user interface for the first access point 800, the first electronic device 100 may disregard the integration device information, already provided to the user, on the basis of the identification name of the first access point 800. However, if there is a change in the contents of the integration device information received from the first access point 800, the first electronic device 100 may provide an updated user interface to the user again.

Meanwhile, when the integration device information is received from the second access point 900, the first electronic device 100 may generate a user interface for the second access point 900 and output the generated user interface in the same way as the user interface shown in FIG. 15.

The user can more easily determine that accessing which access point is better on the basis of the user interfaces according to the embodiment described with reference to FIG. 15. More particularly, if the user wants a network in which TV is a DMR, the user can easily determine that he has to access the first access point 800 after checking that the third electronic device 300 is TV through the user interface of FIG. 15. Accordingly, the user does not need to access the first access point 800 and browse the first network in order to access a desired network and, if there is no desired electronic device, again access the second access point 900 and then browse the second network.

FIG. 16 is a diagram showing a second example of a user interface according to an embodiment of the present invention.

As shown in FIG. 16, the second electronic device 200 may receive two or more in—tegration device information and access point information from two or more access points (for example, the first access point 800 and the second access point 900) and output a single user interface for both the first access point 800 and the second access point 900 on the basis of the received integration device information and access point information.

To this end, when a command corresponding to a search for access points is received from a user, the first electronic device 100 may send a query message to query whether there is an access point around the first electronic device 100 and receive at least one of pieces of integration device information and pieces of access point information from the first access point 800 and the second access point 900 in response to the query message.

In some embodiments, when a command corresponding to a search for access points is received from a user in the state in which beacon signals received from the first access point 800 and the second access point 900 are stored in the first electronic device 100, the first electronic device 100 may generate a user interface for both the first access point 800 and the second access point 900 on the basis of the stored beacon signals and output the generated user interface through the output unit 150.

Referring to FIG. 16, the first electronic device 100 may output the user interface through the display unit 151. A user may determine whether to access the first access point 800 or the second access point 900 on the basis of information displayed in the user interface.

The user may select a button 1030 corresponding to the first access point 800 if he wants to access the first access point 800 or may select a button 1040 corresponding to the second access point 900 if he wants to access the second access point 900.

It is hereinafter assumed that the first electronic device 100 has received a command to request access to the first access point 800 from a user.

Referring back to FIG. 12, when the command to request access to the first access point 800 is received, the first electronic device 100 may request a connection from the first access point 800 at step S350.

The first access point 800 may accept the connection request received from the first electronic device 100 at step S360.

Accordingly, the first electronic device 100 may access the first access point 800, from among the first access point 800 for the first network and the second access point 900 for the second network, thus becoming a member of the first network.

After becoming a member of the first network, the first electronic device 100 may request browse from each of the second to fifth electronic devices at step S370.

More particularly, the first electronic device 100 may send a browse request message to the second electronic device 200, the fourth electronic device 400, and the fifth electronic device 500 which have function of DMS in order to determine that contents to be streamed is stored in which electronic device.

The first electronic device 100 may acquire the container attribute information as described above from the second, fourth, and fifth electronic devices 200, 400, and 500 in response to the browse request message and provide the acquired container attribute information to a user, thereby providing the user with more detailed information related to each of the DMSs.

The first electronic device 100 may send the browse request message to the hub electronic device of the first network. The hub electronic device may refer to an electronic device which integrally manages contents belonging to the first network. For example, in the case where the second electronic device 200 is the hub electronic device of the first network, the second electronic device 200 may integrally manage metadata (for example, contents items and container information) which are managed by the fourth electronic device 400 and the fifth electronic device 500 (that is, DMSs) belonging to the first network.

That is, the first electronic device 100 may know that desired contents is stored in which electronic device by requesting browse from the hub electronic device. In other words, the first electronic device 100 may receive a browse response message from the hub electronic device, determine that desired contents are stored in which electronic device, and request contents stream from the electronic device in which the desired contents are stored.

To this end, access information necessary to access the hub electronic device is included in device information and integration device information. Thus, the first electronic device 100 to newly access a network may acquire the access information for accessing the hub electronic device.

Accordingly, the first electronic device 100 can more easily browse an electronic device in which desired contents is stored.

Meanwhile, in the above embodiment of the present invention, it has been assumed that the first access point 800 obtains device information from each of the second to fifth electronic devices. However, the second electronic device 200 may receive device information from each of the third to fifth electronic devices and send the device in—formation related to each of the second to fifth electronic devices to the first access point 800. That is, in the case where the second electronic device 200 integrally manages the first network, the second electronic device 200 may acquire device in—formation related to each of electronic devices belonging to the first network and share the acquired device information with the first access point 800.

In describing the embodiment of the present invention, it has been assumed that the first access point 800 and the second access point 900 (that is, access points) generate the integration device information. However, the first access point 800 and the second access point 900 may send each of the obtained device information to the first electronic device 100 trying to newly access a network, and the first electronic device 100 may generate integration device information on the basis of the received device in—formation.

Each of the device information sent to the first electronic device 100 may further include information indicating that corresponding device information is related to which access point. For example, device information transmitted from the second electronic device 200 to the first electronic device 100 via the first access point 800 may further include information indicating that the device information is related to the first access point 800.

In an environment including a plurality of sub networks, an electronic device that newly enters a network can more easily join a desired network in accordance with the method of accessing an access point according to the embodiment of the present invention described with reference to FIGS. 11 to 16.

Hereinafter, a second embodiment of the method of accessing an access point is described. In the method of accessing an access point according to the second embodiment, the described method of using container attribute information in the object management method with reference to FIGS. 1 to 10, is applied to the method of accessing an access point described above with reference to FIGS. 11 to 16. That is, a method of providing a user with container attribute information through the user interface described at step S340 of FIG. 12 is described.

Figure 17:
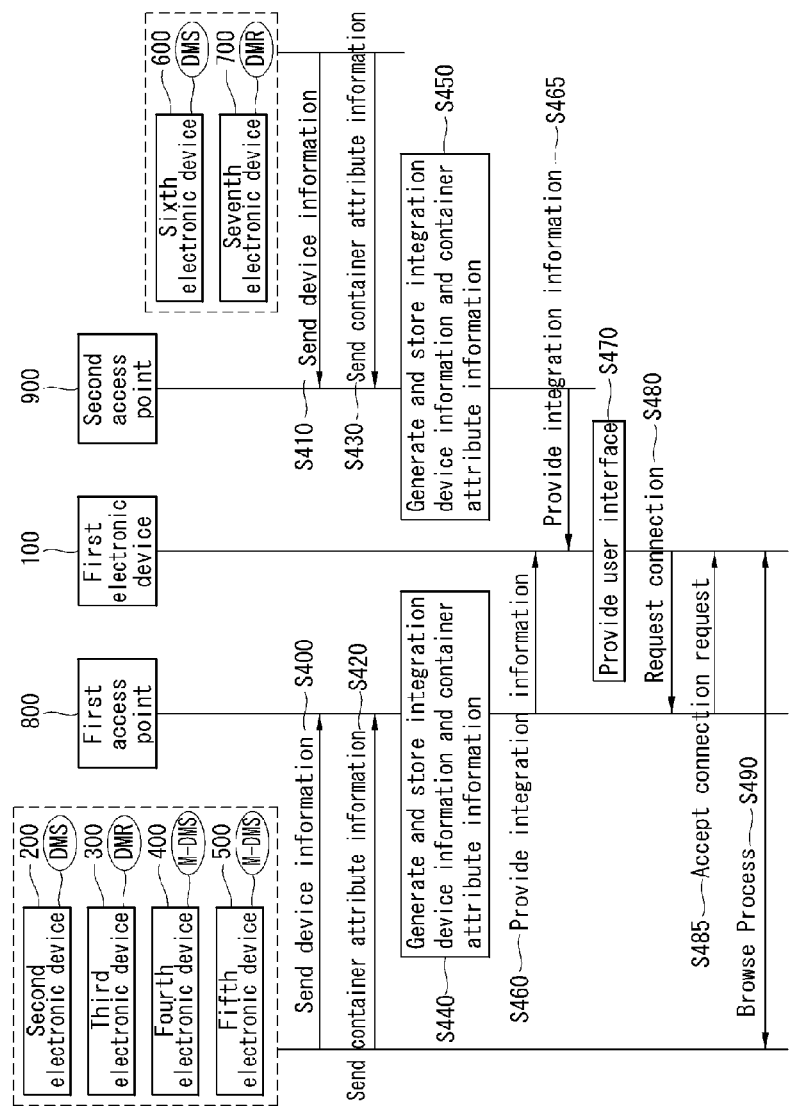
FIG. 17 is a flowchart illustrating a method of accessing an access point according to a second embodiment of the present invention.

FIG. 17 is a flowchart illustrating the method of accessing an access point according to the second embodiment of the present invention. In describing the second embodiment with reference to FIG. 17, a description of portions overlapping with those of FIG. 12 is omitted.

Referring to FIG. 17, as in the first embodiment, the second to fifth electronic devices 200 to 500 may send device information to the first access point 800 at step S400, and the sixth and seventh electronic devices 600 and 700 may send device in—formation to the second access point 900 at step S410.

Steps S400 and S410 are the same as those of FIG. 12, and a detailed description thereof is omitted.

The second, fourth, and fifth electronic device 200, 400, and 500 performing a DMS function, from among the electronic devices constituting the first network in FIG. 11, may send respective container attribute information to the first access point 800 at step S420.

As described above, the container attribute information is metadata for containers respectively managed by the second, fourth, and fifth electronic devices 200, 400, and 500, and it may include information related to at least one of the size of a container, the number of items, and the number of lower containers.

In other words, the second, fourth, and fifth electronic devices 200, 400, and 500 may send the container attribute information to the first access point 800 on a regular basis or whether there is a request. Here, each of the second, fourth, and fifth electronic devices may send root container attribute information or attribute information of a predetermined container. It is hereinafter assumed that the second, fourth, and fifth electronic devices 200, 400, and 500 send root container attribute information to the first access point 800.

The sixth electronic device 600 performing a DMS function, from among the electronic devices constituting the second network in FIG. 11, may send container attribute information to the second access point 900 at step S430.

The first access point 800 may generate and store integration device information and integrated container attribute information at step S440. In other words, the first access point 800 may generate the integration device information on the basis of the device information received at step S400 and generate the integrated container attribute information on the basis of the pieces of container attribute information received at step S420.

The integration device information is the same as that described above, and a description thereof is omitted.

The integrated container attribute information may refer to information in which the container attribute information respectively transmitted from the second, fourth, and fifth electronic devices 200, 400, and 500 to the first access point 800 are integrated. That is, the integrated container attribute information may refer to attribute information related to all containers belonging to the first network. More particularly, the integrated container attribute information may include information related to the total size of containers, the total number of items, and the total number of lower containers which are included in the first network.

The integration device information and the integrated container attribute information are collectively referred to as integration information.

Figure 18:
FIG. 18 is a diagram showing integrated container attribute information according to an embodiment of the present invention.

FIG. 18 is a diagram showing integrated container attribute information according to an embodiment of the present invention.

The upper side of FIG. 18 may refer to the container attribute information a, and the lower side of FIG. 18 may refer to the integrated container attribute information b.

As in step S440, the second access point 900 may generate and store integration device information and integrated container attribute information at step S450.

The first electronic device 100 to newly access a network may obtain integration information from each of the first access point 800 and the second access point 900 at steps S460 and S465.

As described above, the first electronic device 100 may obtain the integration information from the first access point 800 and the second access point 900 as a response to a query message to query whether there is a beacon signal or an access point.

The first electronic device 100 may provide a user interface on the basis of the acquired integration information at step S470.

As in the above description, the first electronic device 100 may separately provide a user interface for the first access point 800 and a user interface for the second access point 900 or may provide a user interface for both the first access point 800 and the second access point 900.

Figure 19:
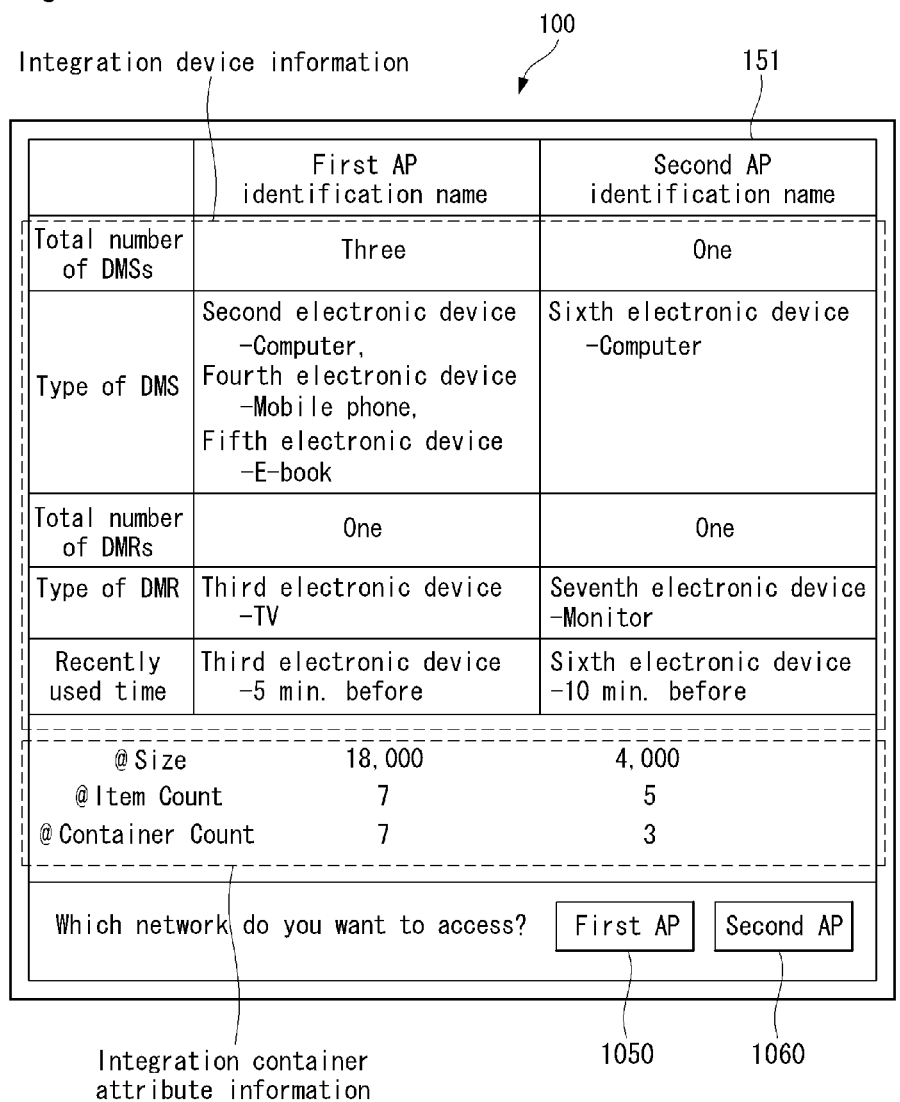
FIG. 19 is a diagram showing an example of a user interface used to access an access point according to a second embodiment of the present invention.

FIG. 19 is a diagram showing an example of a user interface used to access an access point according to a second embodiment of the present invention.

Referring to FIG. 19, the user interface may include integration device information and integrated container attribute information.

A user may determine whether to access which one of the first access point 800 and the second access point 900 on the basis of the user interface shown in FIG. 19 and select a button 1050 or 1060 corresponding to the first access point 800 or the second access point 900.

That is, in the method of accessing an access point according to the second embodiment, container attribute information is provided. Accordingly, a user can more conveniently determine whether to access which access point on the basis of the container attribute information.

For example, the user may want to join a network with a large amount of contents by accessing a network having a larger total size of containers.

Meanwhile, the number of items of the integrated container attribute information shown in FIG. 19 may become the total number of items included in lower containers.

Steps S480 to S490 shown in FIG. 17 correspond to steps S350 to S370 described above with reference to FIG. 12, and a description thereof is omitted.

In described the present embodiment, it has been assumed that the first electronic device 100 outputs the integration device information at step S470. However, the first electronic device 100 may separately output pieces of the container attribute information. For example, the first electronic device 100 may output the pieces of container attribute information for the second, fourth, and fifth electronic devices 200, 400, and 500, respectively.

To this end, the integrated container attribute information may not be generated on the basis of the container attribute information respectively from the second, fourth, and fifth electronic devices 200, 400, and 500 at step S420, but the fourth electronic device 400 may send the pieces of container attribute information to the first electronic device 100.

A user is provided with information related to electronic devices connected to an access point according to the above-described process. Accordingly, the user can more easily determine whether to access which access point, and a network can be more effectively configured according to the embodiments of the present invention.

A variety of embodiments disclosed in this specification may be implemented separately or in combination. The steps constituting each of the embodiments may be implemented in combination with the steps constituting other embodiment.

For example, in the access point access method described with reference to FIG. 11, container attribute information may be used instead of device information. That is, a user can determine whether to access which access point on the basis of the container attribute information.

For example, in the access point access method described with reference to FIG. 11, contents information may be further used in addition to device information. More particularly, since the contents information is provided to an electronic device that newly accesses a network through an access point, a user can determine whether to access which access point on the basis of the contents information. The contents information may also include any information related to various contents managed by electronic devices.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

INDUSTRIAL APPLICABILITY

The electronic device and the operation method of the same manage an object included in a network and provides a user interface for accessing a network, so the electronic device and the operation method of the same configure and manage the network more effectively.

The invention claimed is:

1. An operating method of an electronic device, comprising:
receiving a first device information, prior to connecting with a specific network, the first device information related to characteristic of at least one electronic device, belonging to a first network, from the first network, wherein the first device information comprises a number of electronic devices performing a predetermined function, and a type of the electronic device performing the predetermined function among the at least one electronic device belonging to the first network;
receiving a second device information, prior to connecting with the specific network, the second device information related to characteristic of at least one electronic device, belonging to a second network, from the second network, wherein the second device information comprises the number of electronic devices performing a predetermined function, and a type of the electronic device performing the predetermined function among the at least one electronic device belonging to the second network; and
accessing the specific network selected based on the received first and second device information.

2. The operating method of claim 1, wherein:
the first device information is included in a first beacon signal transmitted by a first access point of the first network, and
the second device information is included in a second beacon signal transmitted by a second access point of the second network.

3. The operating method of claim 1,
wherein the first device information further comprises first update information indicating whether the first device information has been updated based on first generation time information, the first generation time information indicating when the first device information has been generated, and wherein the second device information further comprises second update information indicating whether the second device information has been updated based on second generation time information indicating when the second device information has been generated.

4. The operating method of claim 1, further comprising outputting a user interface generated based on the received first and second device information, wherein the user interface comprises the received first and second device information and queries a user as to whether the user will access which one of the first network and the second network.

5. The operating method of claim 4, further comprising accessing the specific network by connecting to a specific access point and requesting an electronic device managing neighboring electronic devices, from among electronic devices included in the accessed network, to search for contents.

6. The operating method of claim 1, wherein: the first device information receiving step further comprises receiving first container information, including at least one of a total size of a container of all the electronic devices belonging to the first network and the total number of items of all the electronic devices belonging to the first network, and the second device information receiving step further comprises receiving second container information, including at least one of a total size of a container of all the electronic devices belonging to the second network and the total number of items of all the electronic devices belonging to the second network.

7. The operating method of claim 1, wherein the first device information further comprises first use time information indicating when a user has lastly used the at least one electronic device belonging to the first network, wherein the second device information further comprises second use time information indicating when a user has lastly used the at least one electronic device belonging to the second network.

8. An electronic device, comprising:
a communication unit for transmitting and receiving data; and
a control unit for, prior to connecting with a specific network, receiving first device information related to characteristic of at least one electronic device, belonging to a first network, from the first network, receiving second device information related to characteristic of at least one electronic device, belonging to a second network, from the second network, and accessing the specific network selected based on the received first and second device information through the communication unit,
wherein the first device information comprises the number of electronic devices performing a predetermined function, and a type of the electronic device performing the predetermined function among the at least one electronic device belonging to the first network, and
wherein the second device information comprises the number of electronic devices performing a predetermined function, and a type of the electronic device performing the predetermined function among the at least one electronic device belonging to the second network.

9. The electronic device of claim 8, wherein:
the first device information is included in a first beacon signal transmitted by a first access point of the first network and transmitted, and
the second device information is included in a second beacon signal transmitted by a second access point of the second network and transmitted.

10. The electronic device of claim 8, wherein the first device information further comprises first update information indicating whether the first device information has been updated based on first generation time information, the first generation time information indicating when the first device information has been generated, and
wherein the second device information further comprises second update information indicating whether the second device information has been updated based on second generation time information indicating when the second device information has been generated.

11. The electronic device of claim 8, further comprising an output unit, wherein the control unit outputs a user interface generated based on the received first and second device information through the output unit, and the user interface comprises the received first and second device information and queries a user as to whether the user will access which one of the first network and the second network.

12. The electronic device of claim 11, wherein the control unit accesses the specific network by connecting to a specific access point and requests an electronic device managing neighboring electronic devices, from among electronic devices included in the connected network, to search for contents.

13. The electronic device of claim 8, wherein the control unit acquires first container information, including at least one of a total size of a container of all the electronic devices belonging to the first network and the total number of items of all the electronic devices belonging to the first network, and second container information, including at least one of a total size of a container of all the electronic devices belonging to the second network and the total number of items of all the electronic devices belonging to the second network.

14. The electronic device of claim 8, wherein the first device information further comprises first use time information indicating when a user has lastly used the at least one electronic device belonging to the first network,
wherein the second device information further comprises second use time information indicating when a user has lastly used the at least one electronic device belonging to the second network.

* * * * *